(12) United States Patent
Gurevich et al.

(10) Patent No.: US 11,734,529 B2
(45) Date of Patent: Aug. 22, 2023

(54) COMPACT DUAL-LED ILLUMINATION SYSTEM

(71) Applicant: ZEBRA TECHNOLOGIES CORPORATION, Lincolnshire, IL (US)

(72) Inventors: Vladimir Gurevich, Great Neck, NY (US); Qing Tu, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/215,086

(22) Filed: Mar. 29, 2021

(65) Prior Publication Data

US 2022/0309263 A1   Sep. 29, 2022

(51) Int. Cl.
*G06K 7/10* (2006.01)
(52) U.S. Cl.
CPC ..... *G06K 7/10732* (2013.01); *G06K 7/10702* (2013.01); *G06K 7/10831* (2013.01)
(58) Field of Classification Search
CPC .......... G06K 7/10732; G06K 7/10702; G06K 7/10831
See application file for complete search history.

(56) References Cited

U.S. PATENT DOCUMENTS

| 9,273,846 | B1* | 3/2016 | Rossi | G02B 3/005 |
| 10,831,034 | B2* | 11/2020 | Chi | G02B 27/0944 |
| 2017/0146204 | A1 | 5/2017 | Di Trapani et al. | |
| 2018/0259155 | A1 | 9/2018 | Di Trapani | |

FOREIGN PATENT DOCUMENTS

| EP | 1193539 B1 | 11/2005 |
| JP | 2018032386 A | 3/2018 |
| WO | 2020/161124 A1 | 8/2020 |

OTHER PUBLICATIONS

International Search Report and Written Opinion for International Application No. PCT/US2022/012715 dated Apr. 18, 2022.
Novelty Search Report for Belgian Patent Application No. 2022/5211 dated Dec. 7, 2022.

* cited by examiner

*Primary Examiner* — Seung H Lee

(57) ABSTRACT

An optical assembly for illuminating at least one object appearing in a field of view (FOV). The optical assembly includes first and second illumination sources configured to provide first and second illumination to illuminate a target of the object. An aperture configured to collimate the first and second illumination and to provide the illumination to a dual collimator. The dual collimator is disposed to collimate the first and second illumination and to provide the first and second illumination to a dual microlens lens array (MLA). The dual MLA has microlens arrays configured to receive the collimated first and second radiation, to provide two illumination output fields, each output field having a different output illumination field angle.

21 Claims, 11 Drawing Sheets

COMPACT DUAL-LED ILLUMINATION SYSTEM

BACKGROUND OF THE INVENTION

Imaging devices generally capture images within a given field of view (FOV). It is often required that that scanning devices capture images at various distances and at various fields of view to effectively decode information in an image for use in machine vision applications. Additionally, the demand for portable sensors is increasing which requires the use of smaller sensors and smaller illumination systems. Accordingly, portable scanning devices must be capable of functioning with a various width fields of view while generating sharp images over a working range for the purposes of machine vision.

Imaging barcode readers require illumination sources to illuminate a target. Compact imaging systems, such as a compact barcode reader, may require an internal illumination source which is often difficult to implement due to size, power requirements, desired fields of view (FOVs), and/or illumination required for capturing sharp images. Even further, typical auto-focus imaging systems, which can focus at a range of depths and/or FOVs, may not function efficiently with an internal or external illumination system having a fixed illumination profile. For example, it may be preferred to have a wide illumination FOV for reading a barcode at short distances, while having a narrow illumination FOV for reading barcodes at farther distances. Typical imaging systems fail at accomplishing this because many wide FOV illumination systems cannot provide enough illumination to image a target that is at a farther distance. While some systems may address these, and other issues, via a combination of complicated custom optics and bulky components, such systems are fairly complex, costly, large, and can adversely impact reliability of the device. Further, known systems that utilize multiple illumination sources for illumination often suffer from cross-talk between closely spaced collimating lenses which creates parasitic illumination and reduces the useful illumination power. Additionally, many systems implement circular illumination fields which do not typically match targets for decoding resulting in losses of illumination power and reduction of a decoding FOV.

Accordingly, there is a need for improved systems, methods, and devices which address these issues.

SUMMARY

In an embodiment, the present invention is an optical assembly for illumination of a target. The optical assembly comprises a first illumination source configured to provide first illumination along a first optical axis; a second illumination source configured to provide second illumination along a second optical axis, the second optical axis being not coaxial with the first optical axis; an aperture element having a first aperture disposed along the first optical axis and a second aperture disposed along the second optical axis, the first aperture configured to transmit the first illumination and the second aperture configured to transmit the second illumination; a collimator element having a first collimating lens disposed along the first optical axis and a second collimating lens disposed along the second optical axes, the collimator element configured to receive the first illumination and the second illumination from the aperture element and further configured to collimate the first illumination and the second illumination; and a microlens array element having a first microlens array disposed along the first optical axis and a second microlens array disposed along the second optical axes, the microlens array element having a first surface and a second surface, and the microlens array element being configured to receive, at the first surface, the first illumination and the second illumination from the collimator element and further configured to provide, from the second surface, a first output illumination field and a second output illumination field.

In a variation of the current embodiment, the collimator element has a first collimator disposed along the first optical axis configured to collimate the first illumination to propagate along the first optical axis; and a second collimator disposed along a second optical axis configured to collimate the second illumination to propagate along the second optical axis. In a variation of the current embodiment, the collimator element includes a separator element disposed between the first collimator and the second collimator, the separator element configured to prevent the first illumination from entering the second collimator, and further configured to prevent the second illumination from entering the first collimator.

In a variation of the current embodiment, the microlens array element has a first microlens array disposed along the first optical axis configured to magnify the first illumination to provide the first output illumination field; and a second microlens array disposed along the second optical axis configured to magnify the second illumination to provide the second output illumination field.

In a variation of the current embodiment, the first output illumination field has a rectangular intensity profile. In a further variation of the current embodiment, the first output illumination field has a first field angle of less than 25 degrees and a second field angle of greater than 25 degrees.

In a variation of the current embodiment, the second output illumination field has a rectangular intensity profile. In yet a further variation of the current embodiment, rectangular intensity profile of the second output illumination field has a first field angle of less than 30 degrees and a second field angle of greater than 40 degrees.

In a variation of the current embodiment, the optical assembly further comprises an assembly chassis that houses the collimator element and the microlens array element, the assembly chassis configured to support the collimator element and the microlens array element and to maintain a fixed relative position of the collimator element and the microlens array element. In a further variation of the current embodiment, the assembly chassis includes a first collimator support configured to physically contact the collimator element to support the collimator element and to maintain a position of the collimator element; a second collimator support configured to physically contact the collimator element to support the collimator element and to maintain a position of the collimator element; a first microlens array support configured to physically contact the microlens array element to support the microlens array element and to maintain a position of the microlens array element; and a second microlens array support configured to physically contact the microlens array element to support the microlens array element and to maintain a position of the microlens array element. In another variation of the current embodiment, the first and second microlens array supports are interlaced with the first and second collimator supports.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
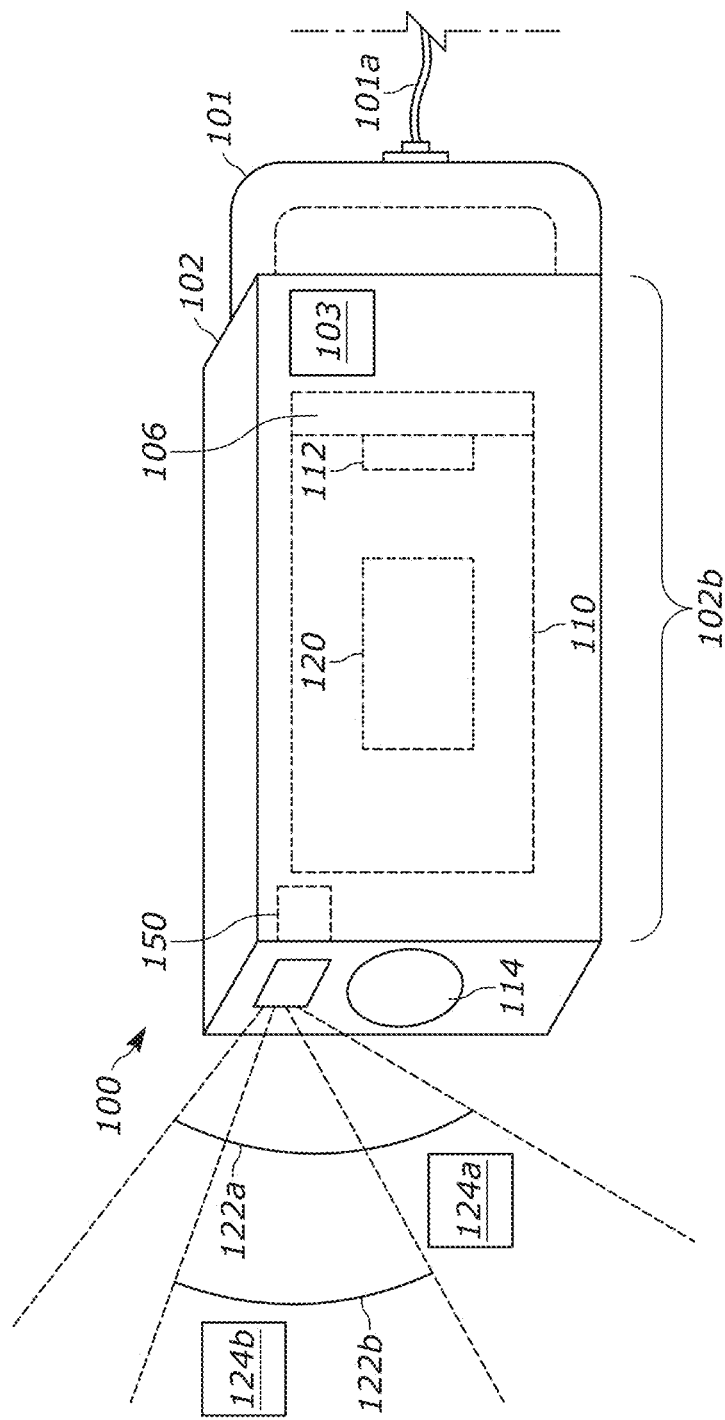
FIG. 1 is a schematic side elevation view of an imaging device having an adaptive illumination system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Portable high-performance optical imaging systems for machine vision employ small imaging sensors to maintain small form factors. For example a typical machine vision imaging sensor has an imaging sensor rectangular area of around 3 by 3 millimeters with sensor pixels areas of approximately 3 microns. Some high-performance compact machine vision systems require wide angle fields of view (FOVs) (e.g., greater than 40 degrees) in addition to small form factor imaging sensors. Barcode readers often require wide imaging FOVs for efficiently reading barcodes at short distances, while requiring narrower FOVs to efficiently read barcodes at further distances. The change in the FOV of a barcode reader changes the pixels per module (PPM) that is able to be imaged by the barcode reader, and therefore, changes the efficiency of barcode imaging and reading. Typically, a barcode reader requires a minimum PPM to properly read a barcode.

To implement a compact barcode reader or imaging system, an internal illumination system may be required. It is often difficult to make an illumination system that meets the wide FOV illumination requirements of high performance barcode readers, while at the same time, producing enough light at farther distances to illuminate a target and properly image and read the target. As described herein, it may be beneficial to generate two illumination fields having different illumination fields of view (FOVs) to have the ability to provide a wide illumination FOV of an illumination system to read barcodes at short distances, while being able to provide a different, narrower FOV of the illumination system to provide more illumination to a target at a farther distance to allow for enough PPMs to read barcodes at different distances.

The current disclosure describes a compact optical assembly with a dual-LED illumination system that can provide two different illumination FOVs. The optical assembly may include an imaging system having a focus distance to an object of interest. The illumination system may be configured to provide a wide illumination FOV when the imaging system is focused at a shorter focal distance, and the illumination system may be configured to provide a narrow illumination FOV when the imaging system is focused at a further distance. The described dual-LED illumination system may be employed in an optical assembly having digital zoom, optical zoom, auto-focus, variable focus elements, or any other optical assembly configured to change the imaging focus or to perform optical detection at different target distances.

The current disclosure describes a dual-LED illumination system that employs a collimating lens, and a dual-MLAs plate that improves upon current technologies by: (i) enabling wide FOV illuminations for objects at a range of distances, (ii) providing narrow FOV illuminations for objects at a range of distances, (iii) providing efficient reading of targets at a large range of focal distances of the imaging system, and (iii) reduces the size and cost of autofocusing optical imaging systems, and specifically the illumination system, for machine vision.

In an exemplary implementation, the present application provides an optical assembly with a dual-field-of-view (FOV) illumination system providing multiple illumination FOVs of one or more objects of interest. In various embodiments of the present disclosure, the optical assembly includes a first illumination source, a second illumination source, an aperture element, a collimator element, and a microlens array element. The first and second illumination sources are configured to provide first and second illumination along first and second optical axes, respectively, to provide illumination to a target. The aperture element is disposed along the first and second optical axes configured to transmit the first and second illumination provided by the first and second illumination sources, respectively. The collimator element is disposed along the first and second optical axes configured to receive the first and second illumination from the first and second illumination sources from the aperture element and further configured to collimate the first and second illumination along the first and second optical axes respectively. The microlens array element is disposed along the first and second optical axes configured to receive the light from the collimator element. The microlens array element has a first surface configured to receive the first and second illumination, and a second surface configured to provide first and second output illumination to the target.

Figure 2:
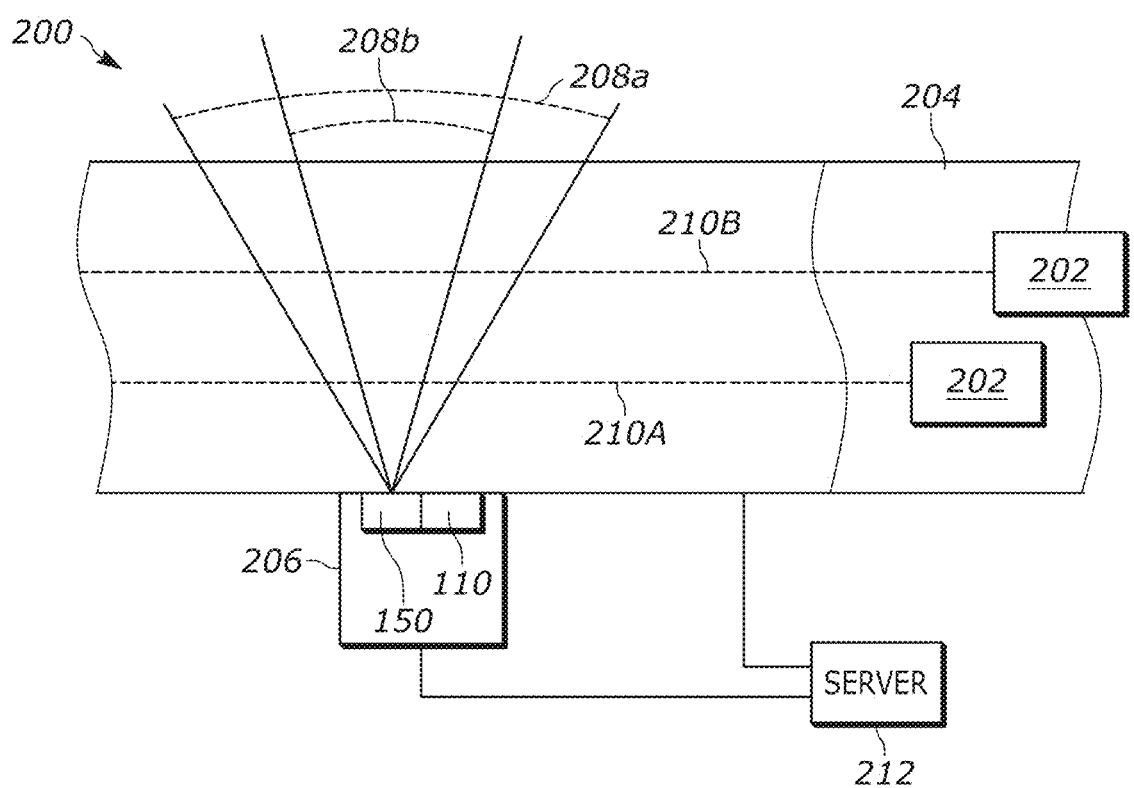
FIG. 2 is a schematic top-view of an imaging scanning station having an autofocus system and an adaptive illumination system in accordance with some embodiments.
Figure 3:
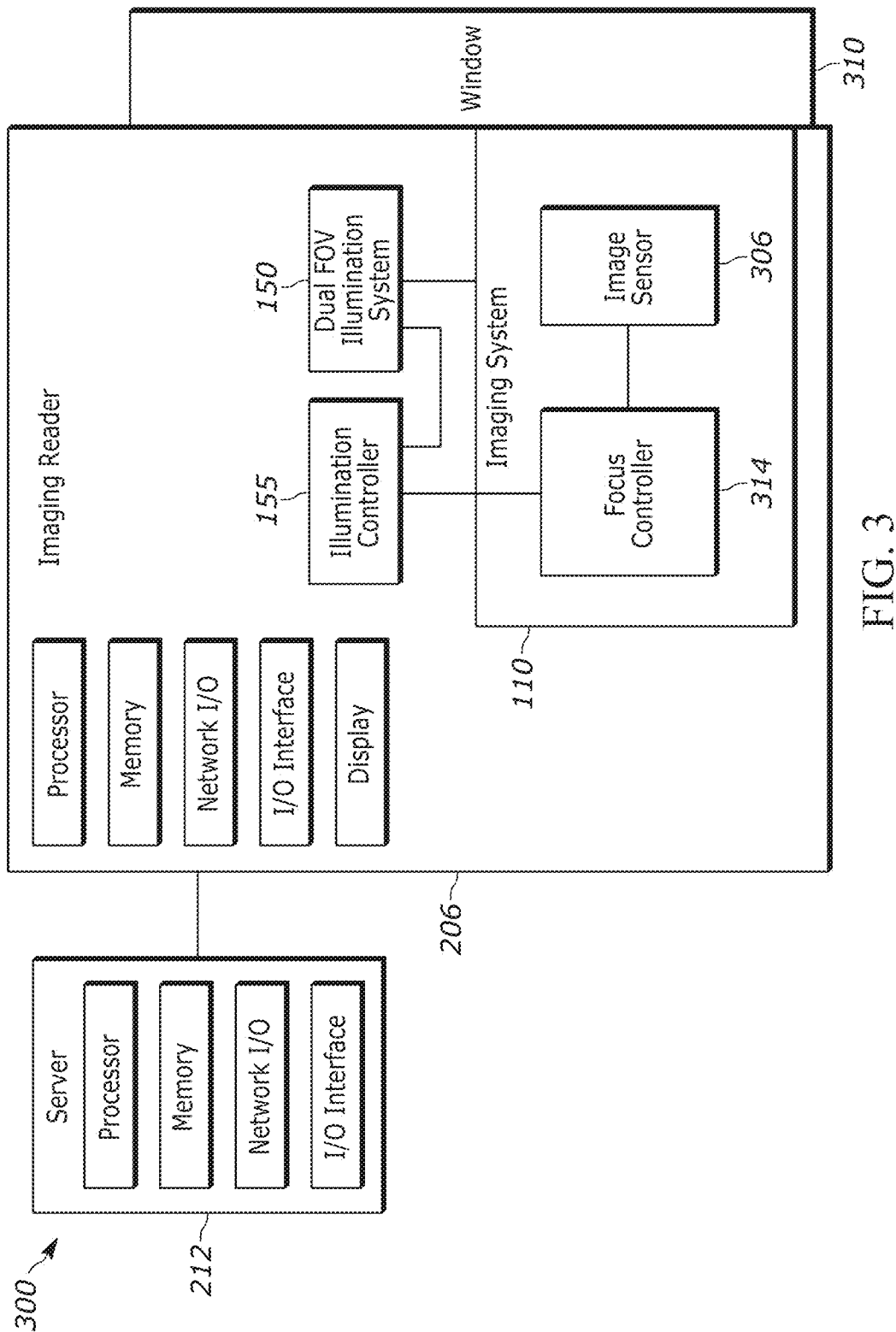
FIG. 3 illustrates a block connection diagram of system including an imaging reader in accordance with the teachings of this disclosure.

A first embodiment of an imaging device, that may include a dual FOV system as described herein, is shown schematically in FIGS. 1-3. The imaging device 100 includes a housing 102, an illumination system 150, and an imaging system 110 at least partially disposed within the housing 102 that includes an imaging camera assembly. Specifically, the imaging system 110 includes an image sensor 112 and a lens assembly 120. The device 100 may be adapted to be inserted into a docking station 101 which, in some examples, may include an AC power source 101a to provide power for the device 100. The device 100 may further include an onboard power supply 103, such as a battery and a printed circuit board 106 that may accommodate a memory and a controller that controls operation of the imaging system 110. In embodiments, the device 100 may include a trigger (not shown in the illustration) is used to activate the imaging system 110 to capture an image. The device 100 may include any number of additional components such as decoding systems, processors, and/or circuitry coupled to the circuit board 106 to assist in operation of the device 100.

The housing 102 includes a forward or reading head portion 102b which supports the imaging system 110 within an interior region of the housing 102. The imaging system 110 may, but does not have to be, modular as it may be removed or inserted as a unit into the devices, allowing the ready substitution of illumination systems 150 and/or imaging systems 110 having different illumination and/or imaging characteristics (e.g., illumination systems having different illumination sources, lenses, illumination filters, illumination FOVs and ranges of FOVs, camera assemblies having different focal distances, working ranges, and imaging FOVs) for use in different devices and systems. In some examples, the field of view may be static.

The image sensor 112 may have a plurality of photosensitive elements forming a substantially flat surface and may be fixedly mounted relative to the housing 102 using any number of components and/or approaches. The image sensor 112 further has a defined central imaging axis, A, that is normal to the substantially flat surface. In some embodiments, the imaging axis A is coaxial with a central axis of the lens assembly 120. The lens assembly 120 may also be fixedly mounted relative to the housing 102 using any number of components and/or approaches. In the illustrated embodiment, the lens assembly 120 is positioned between a front aperture 114 and the image sensor 112. The front aperture 114 blocks light from objects outside of the field of view which reduces imaging problems due to stray light from objects other than the target object. Additionally, the front aperture 114 in conjunction with a one or more lenses allows for the image to form correctly on the imaging sensor 112.

The housing 102 includes an illumination system 150 configured to illuminate a target object of interest for imaging of the target. The target may be a 1D barcode, 2D barcode, QR code, UPC code, or another indicia indicative of the object of interest such as alphanumeric characters or other indicia. The illumination system 150 may be a dual FOV illumination system as described further herein. The illumination system 150 may adaptively provide a wide-angle illumination FOV 122a to enable wide-angle imagine of a close target 124a, or provide a narrow-angle illumination FOV 122b to for imagine of a far-away target 124b.

FIG. 2 illustrates an embodiment of a scanning station 200 that includes a dual FOV illumination system. Goods 102 are moved across or along a scanning surface 204, are illuminated by a dual FOV illumination source 150, and imaged by an imaging system 110, of an imaging reader 206 to identify the goods 202. In some embodiments, the scanning station 200 is a point-of-sale (POS) station, which may have a computer system and an interface, not shown, for optically scanning goods and identifying the goods and characteristics of the goods for affecting a transaction. In some embodiments, the scanning station is part of an inventory delivery system, where goods are conveyed by the scanning surface or across the scanning surface to monitor and control delivery of the goods, for example, shipping goods from a facility or receiving shipped goods to a facility.

The scanning surface 204 may be a stationary surface, such that the goods 202 are manually moved relative to the surface 204. In embodiments, the scanning surface 204 may move the goods 202 or be moved by another automated means. In other embodiments, the scanning surface 204 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 202 may be moved continuously relative to the imaging reader 206, such that the goods 202 are constantly moving through a current working (or scanning) range of the station 200. For example, the station may have a wide-angle working range 208a and a narrow FOV 208b depending on the distance of the good 202, an illumination FOV of the dual FOV illumination system 150, and/or an FOV of the imaging system 110. In some examples, the goods 202 move in a discretized manner, where, at least part of the time the goods 202 are maintained fixed on the surface 204 relative to the imaging reader 206 for a period of time, sufficient to allow one or more images to be captured of the goods 202.

The goods 202 may move along different substantially linear paths 210A, 210B, etc. each path traversing the working ranges 208a and 208b but at a different distance from the imaging reader 206. The dual FOV illumination system 150 may provide illumination according to one or more illumination FOVs depending on the distance of the goods 202 from the imaging reader 206. For example, the imaging system 110 may determine an imaging focal distance of the good 202 and the dual illumination system 150 may provide illumination having a FOV depending on the imaging focal distance. In embodiments, a controller may control the dual illumination system 150 to control the FOV of the dual illumination system 150. The paths 210A, 210B are for illustration purposes, as the goods 202 may traverse across the surface 204 at any distance from the imaging reader 206, and, accordingly, the dual FOV illumination system may provide one or more illumination FOVs for imaging the goods depending on the distance of the goods 202 from the imaging reader 206.

FIG. 3 illustrates a block connection diagram of system 300 including an imaging reader 206. While in reference herein to the imaging reader 206 of FIG. 2, the system 300 may be implemented with the imaging device 100 of FIG. 1. In FIG. 3 the imaging reader 206 may have one or more processors and one or more memories storing computer executable instructions to perform operations associated with the systems and methods as described herein. The imaging reader 206 includes a network input/output (I/O) interface for connecting the reader to the server 212, an inventory management system (not shown), and other imaging readers. These devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards. The imaging reader 106 further includes a display for providing information such as visual indicators, instructions, data, and images to a user.

In some embodiments, the server 212 (and/or other connected devices) may be located in the same scanning station 200. In other embodiments, server 212 (and/or other connected devices) may be located at a remote location, such as on a cloud-platform or other remote location. In still other embodiments, server 212 (and/or other connected devices) may be formed of a combination of local and cloud-based computers.

Server 212 is configured to execute computer instructions to perform operations associated with the systems and methods as described herein. The server 212 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

In the illustrated example, the imaging reader 206 includes a dual FOV illumination system 150, which may include a visible light source (e.g., a light emitting diode (LED) emitting at 640 nm) or an infrared light source (e.g., emitting at or about 700 nm, 850 nm, or 940 nm, for example), with the dual FOV illumination system 150 capable of generating an illumination beam that illuminates the working range 208a or 208b for imaging over an entire working distance of that working range 208a or 208b. That is, the dual FOV illumination system 150 is configured to illuminate over at least each of the entire working ranges 208a and 208b. In embodiments, the dual FOV illumination system 150 may be capable of illuminating a plurality of working ranges with each having a corresponding FOV and working distance from the imaging reader 206. The illumination intensity of the dual FOV illumination system 150 and the sensitivity of an imaging reader can determine the further and closest distances (defining the distance of the working range, also termed the scanning range), and the working ranges in respect to illumination FOV, over which a good can be scanned, and a barcode on the good can be decoded.

The dual FOV illumination system 150 may be controlled by a processor and may be a continuous light source, an intermittent light source, or a signal-controlled light source, such as a light source trigged by an object detection system coupled (or formed as part of though not shown) to the imaging reader 206. The dual FOV illumination system may include a light source such as a laser diode, an LED, a black body radiation source, an infrared light source, a near-infrared light source, an ultraviolet light source, a visible light source, an omnidirectional illumination source, or another illumination source. Additionally, the dual FOV illumination system 150 may include optics for dispersing, focusing, spreading, and/or filtering optical radiation for illumination of the target object. In embodiments, the dual FOV illumination system 150 may be housed inside of the housing 102 of FIG. 1 or may attach to the external surfaces of the housing 102. In embodiments, the imaging system 110 may be housed in the imaging reader 206 of FIG. 3 or may attach to the external surface of the imaging reader 206. In embodiments, the dual FOV illumination system 150 may be a separate device or component from the housing 102 and/or imaging reader 106, with the dual FOV illumination system 150 configured to illuminate the target object for capturing an image by the imagine device 100 or the imaging reader 106.

The imaging reader 106 further includes the imaging system 110 having an imaging sensor 306 positioned to capture images of an illuminated target, such as the goods 102 or another object of interest (OOI), within a working range 208a or 208b of the imagine reader 206. In some embodiments, the imaging sensor 306 is formed of one or more CMOS imaging arrays. In some embodiments the imaging sensor may be a charge coupled device or another solid-state device. The imaging sensor 306 may be a one megapixel sensor with pixels of approximately three microns in size. In embodiments, the imaging sensor includes 3 millimeter pixels, having a total of about 2 megapixels, resulting in an overall imaging sensor width and length of 3 microns in each dimension. In embodiments, the imaging sensor 306 may be a variable focus imaging sensor such as an auto-focus camera capable of changing imaging focal planes for imaging objects at different distances from the imaging reader 206.

The imaging reader may include one or more windows 310 for allowing illumination from the dual FOV illumination system 150 to exit the imaging reader 206, and for light from the OOI to reach the image sensor 306. In embodiments, the adaptive illumination system 150 may be external to the imaging reader 206 and the external illumination system may include a window for transmitting the illumination, or the external illumination system may emit the illumination into free space without the use of a window. In embodiments, the dual FOV illumination system 150 may include one or more apertures configured to allow illumination to pass through the apertures to provide illumination to the OOI. In embodiments, the dual FOV illumination system 150 may provide illumination to an OOI through optical filters, a window, spatial filters, an aperture, or another structure to provide the illumination of the OOI.

A focus controller 314 is coupled to the controls the imaging sensor 306 and any variable focus optics (e.g., a deformable lens, a liquid lens, a translatable lens, a translatable grating, or other variable focus optical elements) to define one or more discrete imaging planes for the imaging sensor 306. In embodiments, the imaging system 110 may include a focusing lens drive, a shift lens drive, a zoom lens drive, an aperture drive, angular velocity drive, voice coil motor drive, and/or other drive units for controlling the focal distance of the imaging system 110, which may further include multiple lens, lens stages, etc. In embodiments, once a focal plane for imaging an OOI is established by the image sensor 306, the focus controller 314, and/or a processor in communication with the image sensor 306 and focus controller 314, information indicative of the focal distance may be provided to the illumination controller 55. The illumination controller 155 may process the information indicative of the focal distance to determine a desired FOV and illumination distance (i.e., illumination intensity output) of the dual FOV illumination system 150. The illumination controller 155 may then control the dual FOV illumination system 150 to cause the dual FOV illumination system 150 to provide illumination according to the determined FOV for an illumination distance. For example, the controller 155 may control the dual FOV illumination system 150 to cause the dual FOV illumination system 150 to provide near-field illumination, or far-field illumination discussed further herein. In some embodiments, the dual FOV illumination system 150 includes a plurality of illumination sources and the dual FOV illumination system 150 may control one or more of the plurality of illumination sources to provide a FOV according to the desired illumination distance.

In embodiments, the memory may store information regarding the focal distances of OOIs such as the good 202 and the illumination controller 155 may retrieve the information from the memory to determine a desired illumination FOV and illumination intensity, or a plurality of potential illumination FOVs and illumination intensities. The illumination controller 155 may then determine, based on information from the focus controller 314 one of the plurality of illumination FOVS and illumination intensities, and control the dual FOV illumination system 150 to provide illumination at the determined illumination FOV and illumination intensity. Further, the illumination controller may control the dual FOV illumination system 150 to provide illumination according to various FOVs and illumination intensities to determine desired illumination parameters for a given OOI, or to provide the imaging system 110 with various illuminations for capturing a plurality of images on an OOI. A preferred illumination may then be determined by the imaging system 110, or a processor in communications with the imaging system 110, and the illumination controller 155 may be provided with the determined desired illumination.

Figure 4A:
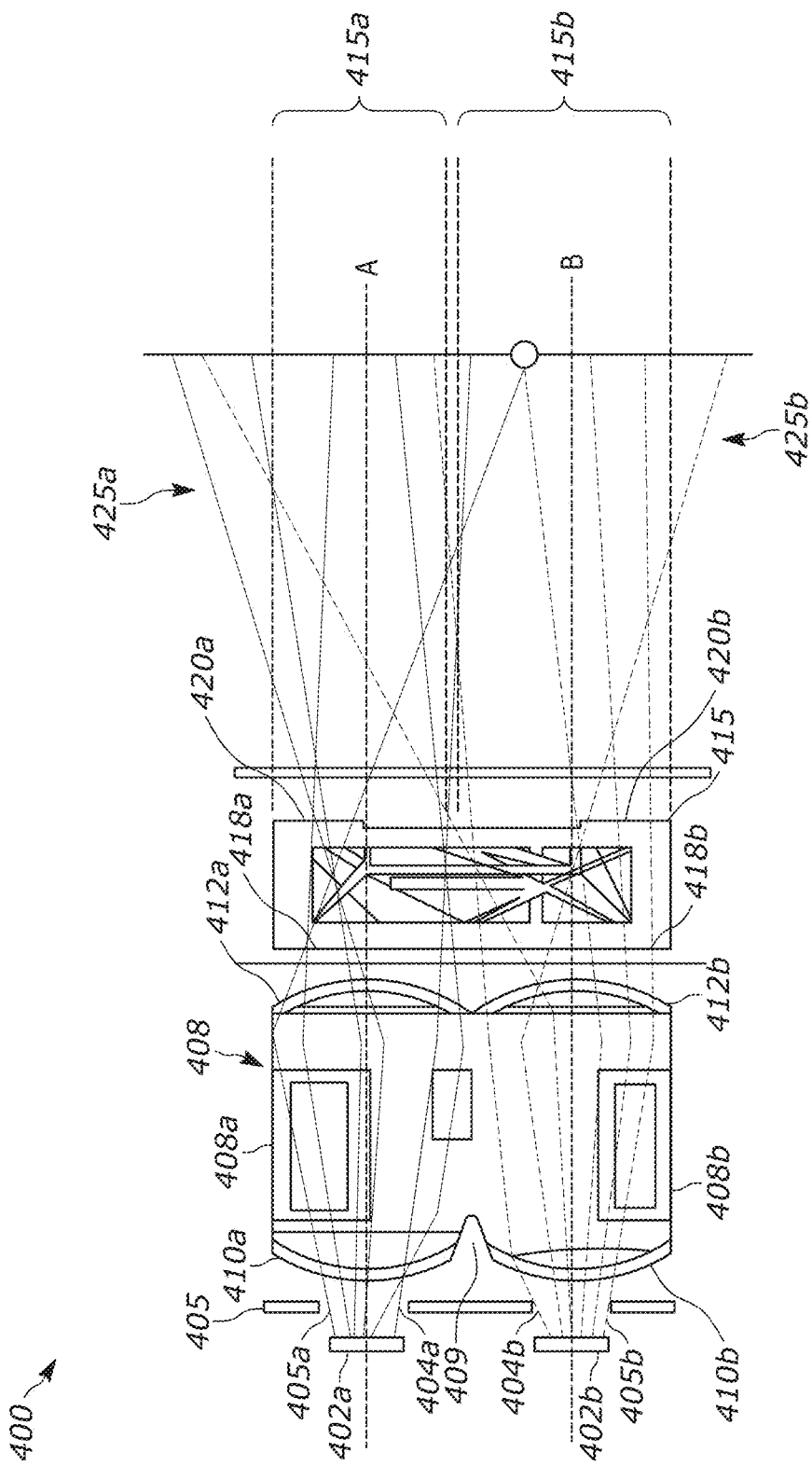
FIG. 4A is a cross-sectional side view of a ray trace of an optical assembly of a dual illumination system.
Figure 4B:
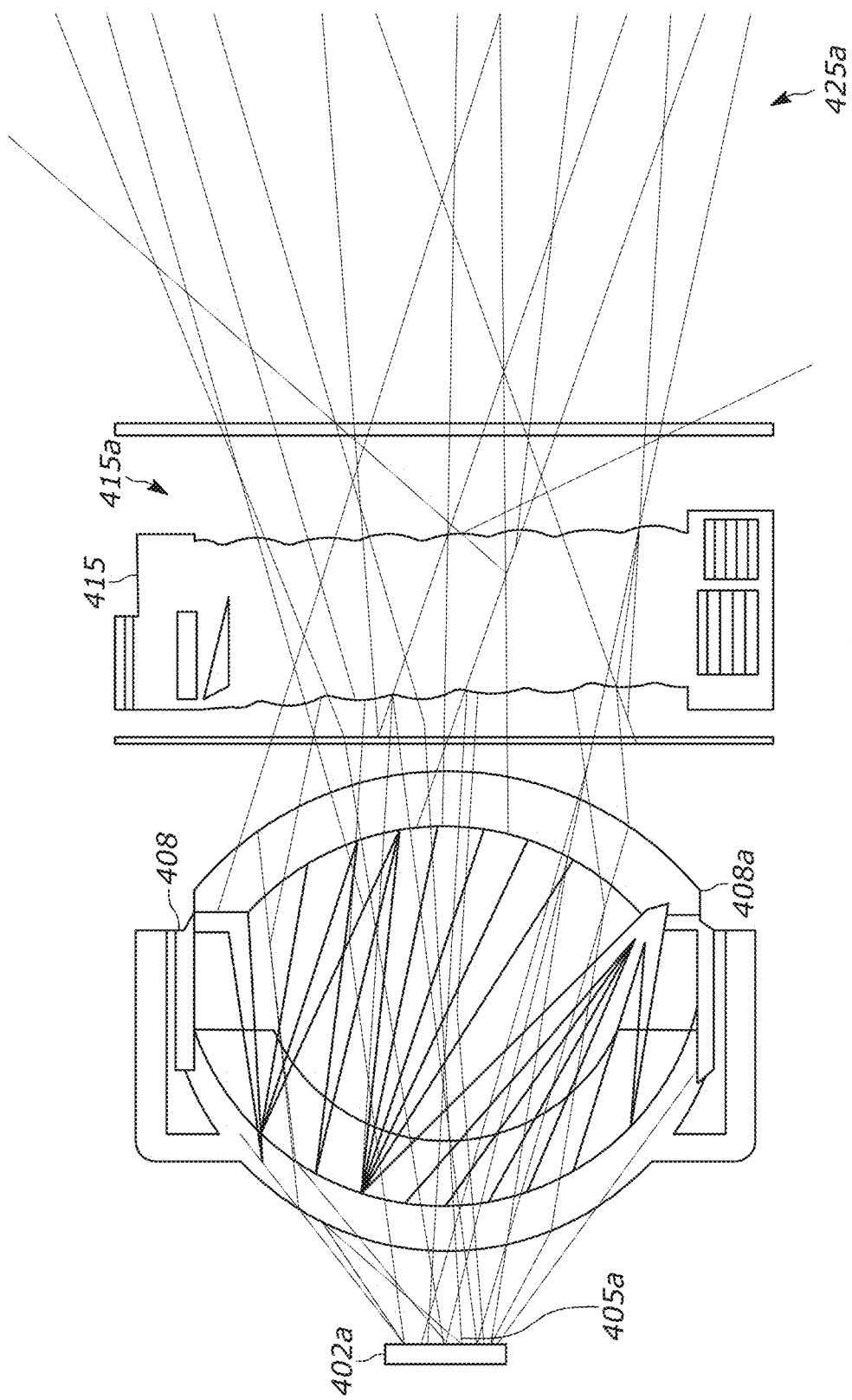
FIG. 4B is a top view of a ray tracing of a far field illumination of the optical assembly of FIG. 4A.
Figure 4C:
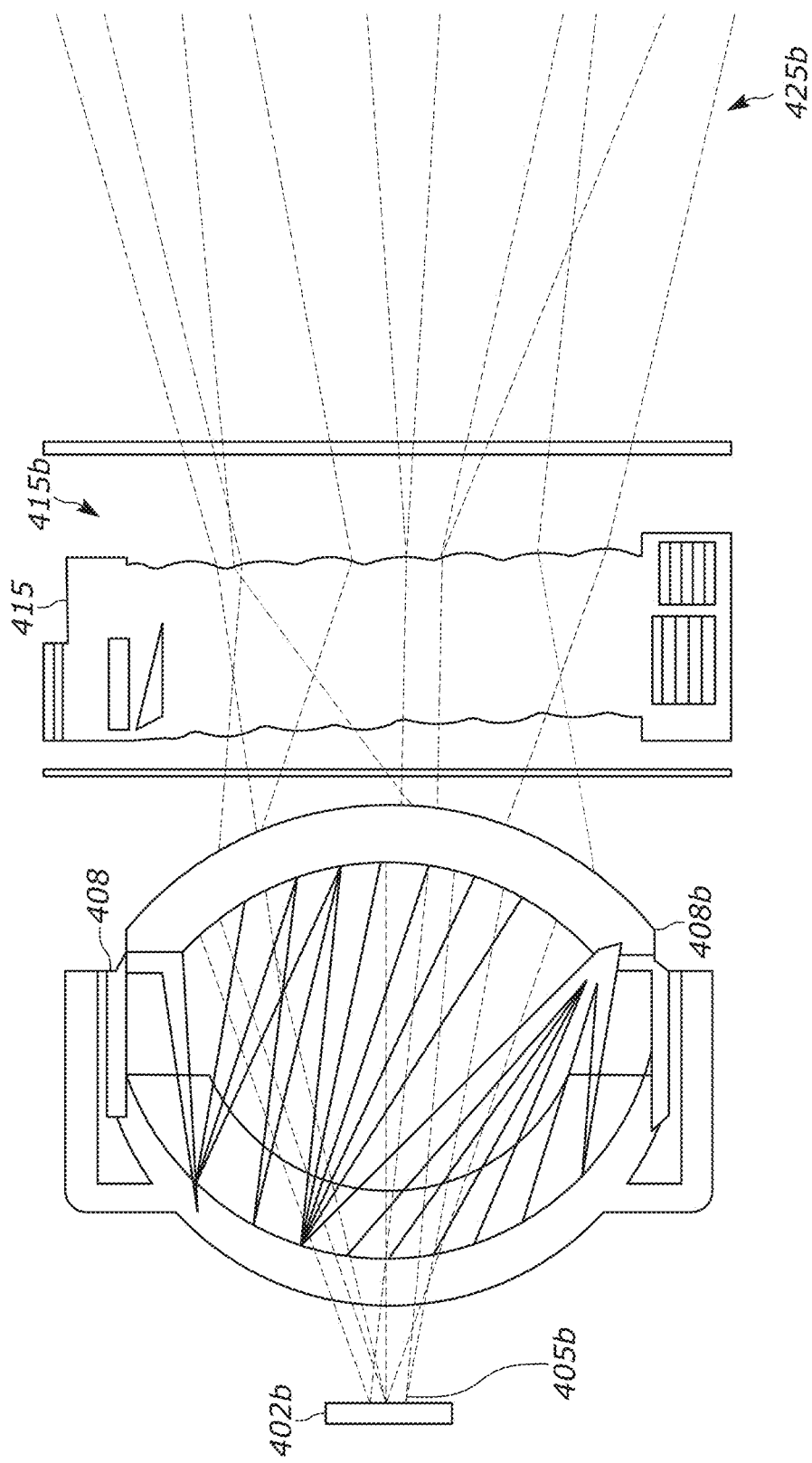
FIG. 4C is a is a top view of a ray tracing of a near field illumination of the optical assembly of FIG. 4A.

FIG. 4A is a cross-sectional side view of a ray trace of an embodiment of an optical assembly 400 of a dual illumination system, FIG. 4B is a top view of a far field ray trace of the optical assembly 400 of FIG. 4A, and FIG. 4C is a top view of a near field ray trace of the optical assembly of FIG. 4A. The optical assembly 400 includes a first illumination source 402a and a second illumination source 402b. The first illumination source 402 is disposed along a first optical axis, A, to provide first illumination 404a along the first optical axis, A. The second illumination source 402b is disposed along a second optical axis, B, configured to provide second illumination 404b along the second optical axis, B. In embodiments, the first and second illumination sources 402a and 402b may include one or more light-emitting diodes (LEDs), laser diodes, lasers, black body radiation sources, or another illumination source. In embodiments, the first and second illumination 404a and 404b may include one or more of infrared radiation, near-infrared radiation, visible light, optical radiation, ultraviolet radiation, or another type of radiation for illumination of a target for imaging of the target. The first and second illumination sources 402a and 402b may be square light sources and center points of the first and second illumination sources 402a and 402b may be disposed between 1 and 5 mm apart, between 5 and 10 mm apart, less than 10 mm apart, or greater than 1 cm apart. Further, the first and second illumination sources 402a and 402b may be 1 mm by 1 mm square, 2 mm by 2 mm square, 5 mm by 5 mm square, or larger than 5 mm by 5 mm square. The first and second illumination sources 402a and 402b may also be circular, rectangular, or another geometric shape. The optical assembly includes an aperture element 405 having a first aperture 405a and a second aperture 405b. The first illumination 404a propagates along the first optical axis A through the first aperture 405a, and the second illumination 404b propagates along the second optical axis B through the second aperture 405b. The first and second apertures 405a and 405b may be independent apertures, or they may be two apertures of a same larger aperture element, such as two holes or openings in a single material with the two holes being independent and spatially separated by some distance. Further, the first and second apertures 405a and 405b may be a same large aperture that transmits both the first and second illumination 404a and 404b.

A collimator element 408 is disposed along the first and second optical axes A and B to collimate the first and second illumination 404a and 404b. The collimator element 408 has a first collimator 408a and a second collimator 408b. The first collimator has a first collimator entry surface 410a configured to receive the first illumination 404a from the first aperture 405a, and the second collimator 408b has a second collimator entry surface 410b configured to receive the second illumination 404b from the second aperture 405b. The first and second collimator entry surfaces 410a and 410b may be separated by a separator element 409 that prevents at least some of the first illumination 404a from entering the second collimator 408b, and further prevents at least some of the second illumination 404b from entering the first collimator 408a. The separator element 409 may include a wedge or wall of air, metal, plastic, glass, or another material. The first collimator 408 has a first collimator exit surface 412a disposed along the first optical axis A to provide collimated first illumination 404a to a microlens array element 415. The second collimator 408 has a second collimator exit surface 412b disposed along the second optical axis B to provide collimated second illumination 404b to the microlens array element 415.

The microlens array element 415 is disposed along the first and second optical axes A and B to receive the collimated first and second illumination 404a and 404b from the collimator element 408. The microlens array element 415 has a first microlens array 415a and a second microlens array 415b. The first microlens array 415a has a first microlens entry surface 418a disposed along the first optical axis A to receive the first illumination 404a. The first microlens array 415a also has a first microlens exit surface 420a to provide the first illumination 404a as a first output illumination field 425a, illustrated by solid lines in FIG. 4A, to a target for imaging of the target. The second microlens array 415b has a second microlens entry surface 418b disposed along the second optical axis B to receive the second illumination 404b. The second microlens array 415b also has a second microlens exit surface 420b to provide the second illumination 404b as a second output illumination field 425b, illustrated as broken lines in FIG. 4A, to a target for imaging of the target. Each of the first and second microlens arrays 415a and 415b may each independently spread input radiation or stretch an input radiation field to provide an output illumination field with one or more dimensions having a wider field angle than input collimated illumination. The microlens array element 415 may be a plastic material such as Zeonex, Acrylic Polycabronate, K26R, E48R, or another plastic material. In embodiments, the microlens array element 415 may be a glass material or other optical material able to transmit light. Further, the distance between either of the first and/or second illumination sources 402a and 402b to the second surface of either of the first and/or second microlens exit surfaces 420a and 420b may be 5 mm, 7 mm, 10 mm, 12 mm, less than 15 mm, less than 10 mm, or less than 8 mm to provide a compact form factor for the optical assembly 400

Figure 5A:
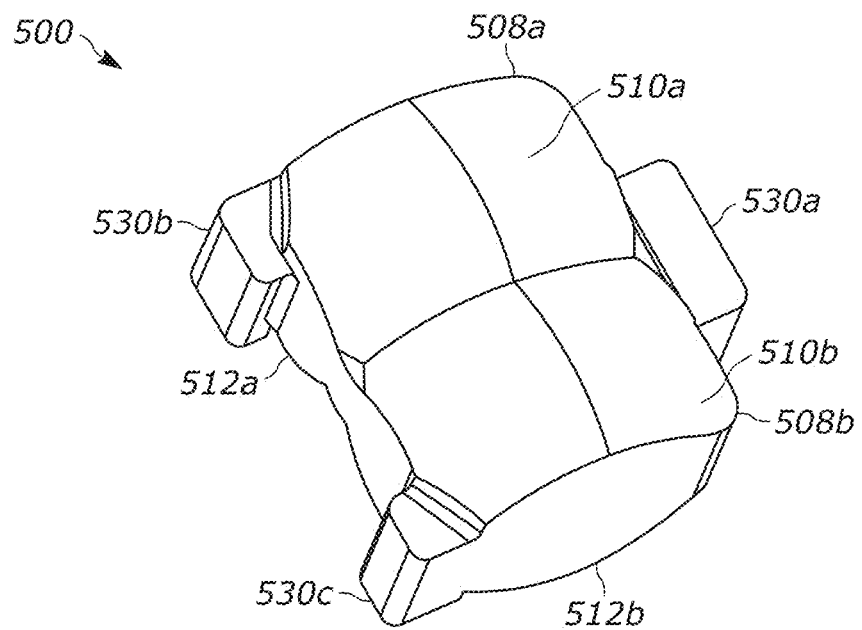
FIG. 5A is a first perspective view of a dual-collimator in accordance with the teachings of this disclosure.
Figure 5B:
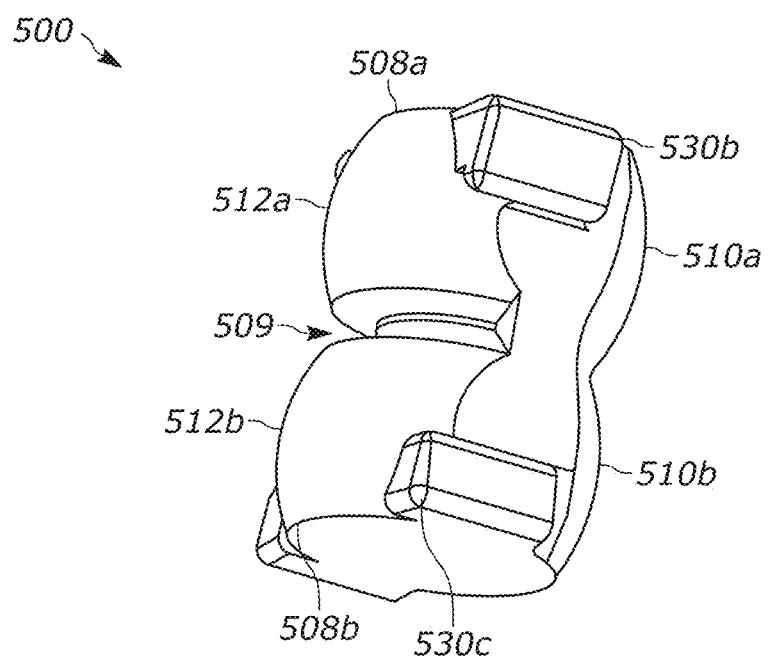
FIG. 5B is a second perspective view of the dual-collimator of FIG. 6A in accordance with the teachings of this disclosure.

FIG. 5A is a first perspective view of a dual-collimator 500 and FIG. 5B is a second perspective view of the dual-collimator 500 of FIG. 5A. The dual-collimator 500 of FIGS. 5A and 5B may be implemented as the collimator element 408 of FIG. 4A. The dual-collimator 500 has a first collimator 508a and a second collimator 508b. The first collimator 508a has a first collimator entry surface 510a and a first collimator exit surface 512a. The first collimator entry surface 510a and the first collimator exit surface 512a may each independently be a concave surface, a convex surface, an aspheric surface, or another surface to collimate illumination. The second collimator 508b has a second collimator entry surface 510b and a second collimator exit surface 512b. The second collimator entry surface 510b and the second collimator exit surface 512b may each independently be a concave surface, a convex surface, an aspheric surface, or another surface to collimate illumination.

The dual-collimator 500 may also include a wedge 509 between the first collimator 508a and the second collimator 508b. The wedge 509 prevents illumination that enters the first collimator 508a from propagating into the second collimator 508b, and further prevents illumination that enters the second collimator 508b from propagating into the first collimator 508a. As illustrated in FIG. 5B, the wedge 509 may be a divot in the dual-collimator, but in embodiments, the wedge 509 may include a material such as a metal, a mirror, a thin film, an optical filter, a plastic, a glass material, or another material or element capable of prevent optical cross-talk between the first and second collimators 508a and 508b. In embodiments, the dual-collimator may include one or more of a plastic, a glass, or another optically transparent medium. The dual-collimator 500 also includes three tabs 530a, 530b, and 530c. The tabs 530a, 530b, and 530c are for positioning the dual-collimator 500 in a chassis. The tabs 530a, 530b, and 530c allow for efficient use of space and provide a means for fabricating compact illumination systems. Typically, optical elements, such as collimators, require bulky mounts and positioning actuators that result in large optical systems. The tabs 530a, 530b, and 530c enable the fabrication of smaller, less expensive, and portable optical systems.

Figure 6:
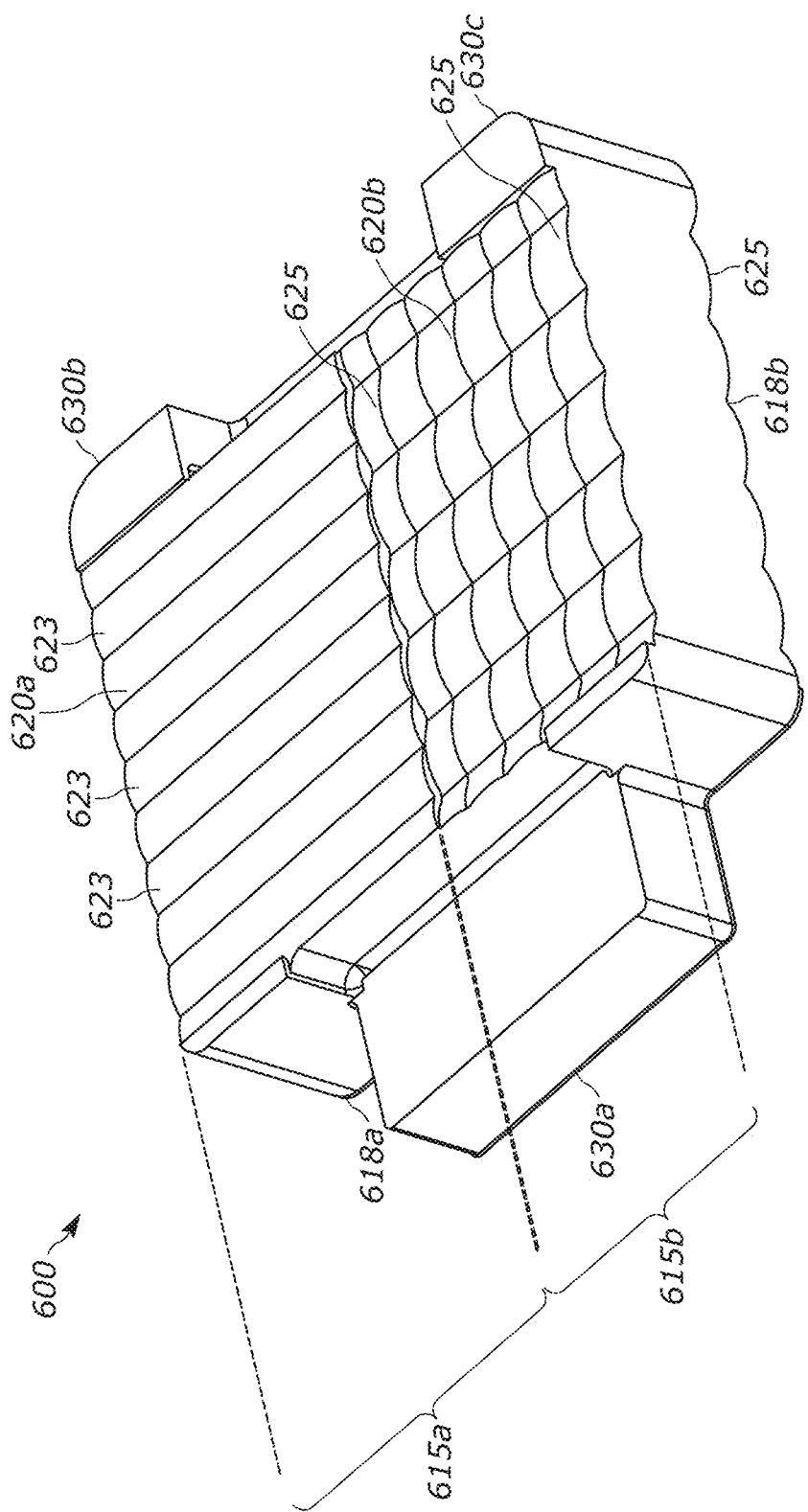
FIG. 6 is a perspective view of a dual-micro-lens array (MLA) plate with a far MLA section and a near MLA section in accordance with the teachings of this disclosure.

FIG. 6 is a perspective view of a dual-micro-lens array (MLA) plate 600 with a far MLA section 615a and a near MLA section 615b. The dual MLA plate 600 of FIG. 6 may be implemented as the microlens array element 615 of FIG. 4A. The far MLA section 615a has a far section entry surface 618a that receives radiation, and a far section exit surface 620a that further magnifies the radiation according to a desired illumination field for a far field of view. In embodiments, each of the far section entry and exit surfaces 518a and 520a may include an array of cylindrical lenses that provide a magnification in a single transverse direction. The far MLA section 615a may be employed to provide illumination of one or more targets at distances from 40 inches to 200 inches. The far MLA section 615a may contribute to illuminating targets beyond 200 inches. The far MLA section 615a may provide an illumination field having horizontal and vertical field angles of 30 degrees by 20 degrees, 30 degrees horizontally, and by less than 20 degrees vertically, by less than 35 degrees horizontally, and less than 25 degrees vertically. In embodiments, the far MLA section 615a may include a 8 by 1 array of 0.5 by 3.1 mm microlenses.

The near MLA section 615b has a near entry surface 618b that receives radiation, and a near exit surface 620b that further provides the radiation as an illumination field for a near field of view. In embodiments, each of the near section entry and exit surfaces 520a and 520b may include an array of rectangular lens elements 625 for providing a rectangular illumination field for a near field target. The near MLA section 615b may be employed to provide illumination of one or more targets at distances from 2 inches to 240 inches. The near MLA section 615b may contribute to illuminating targets beyond 40 inches. The near MLA section 615b may provide an illumination field having horizontal and vertical field angles of 51 degrees by 28 degrees, 50 degrees horizontally and by less than 30 degrees vertically, by less than 60 degrees horizontally, and more than 20 degrees vertically. In embodiments, the near MLA section 615b may include a 5 by 6 array of 0.8 by 0.46 mm microlenses. Each of the far and near sections 615a and 615b may provide output illumination fields having different intensity profiles for illuminating a target at far and near distances. The dual MLA plat 600 also includes positioning tabs 630a, 630b, and 630c for physically aligning the dual MLA plate 600 in a chassis, further described in reference to FIGS. 8A and 8B. The tabs 630a, 630b, and 630c allow for simplified optical alignment, fabrication of more compact illumination devices, and for reducing cost of illumination systems.

Figure 7A:
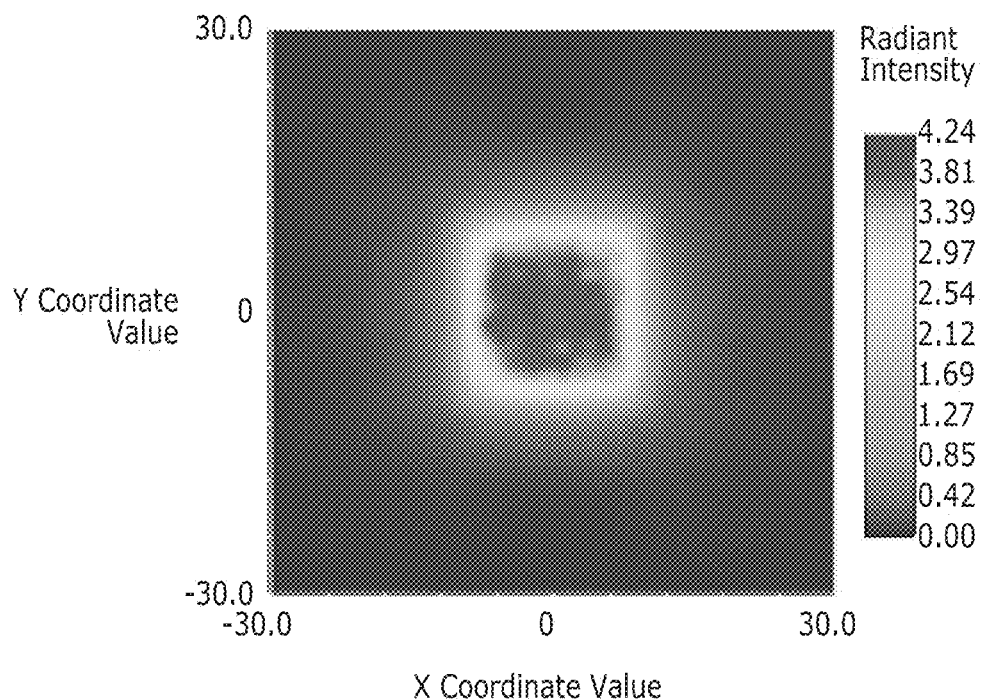
FIG. 7A is the illumination full field angle for the dual-collimator of FIGS. 5A and 5B.

FIG. 7A is a plot of the illumination full field angle output by a collimator of a dual-collimator, such as the first or second collimators 508a and 508b of the dual-collimator 500 of FIGS. 5A and 5B. The illumination field illustrated in FIG. 7A has a square intensity profile with a field angle of less than 20 degrees. In embodiments, each of the first collimator 508a and second collimator 508b of the dual-collimator 508 may collimate illumination having a field angle of between 10 and 20 degrees, between 15 and 30 degrees, between 30 and 50 degrees, less than 15 degrees, less than 20 degrees, less than 30 degrees, less than 40 degrees, or less than 50 degrees. Further, the first and second collimators 508a and 508b of the dual-collimator 508 may independently output collimated illumination having different field angles. The illumination field of FIG. 7A is an example of a collimated illumination field that may be provided to a dual MLA array such as the dual MLA array plate 600 of FIG. 6.

Figure 7B:
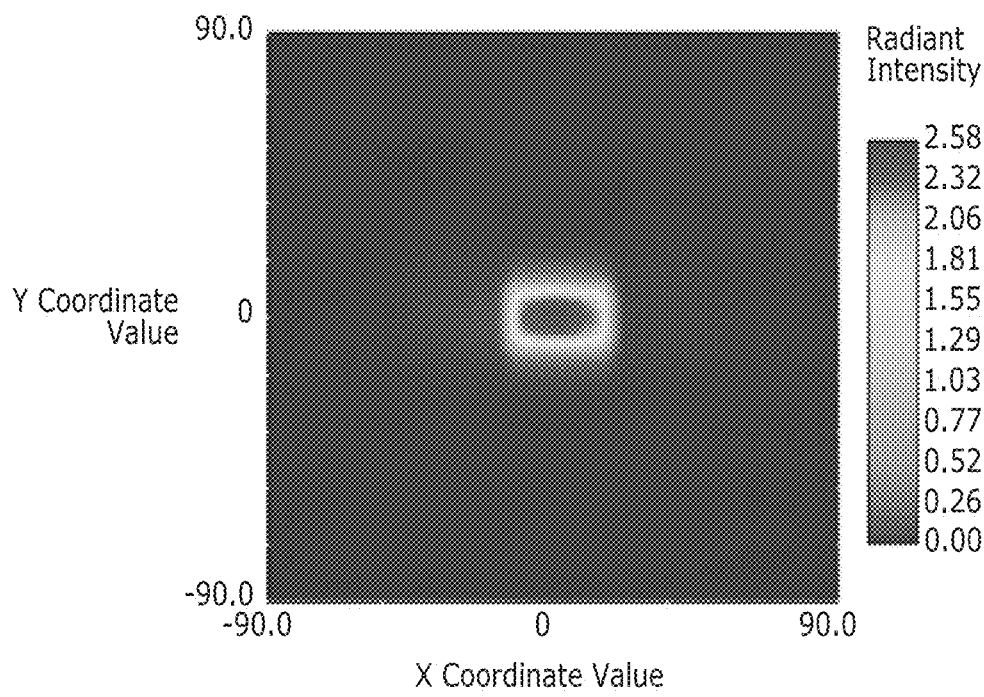
FIG. 7B is the illumination full field angle for a far MLA section of the dual MLA of FIG. 6.

FIG. 7B is a plot of the illumination full field angle output by a far MLA section of a dual MLA, such as the dual MLA plate of FIG. 6. The intensity profile presented in FIG. 7B is rectangular with a horizontal (i.e., x-coordinate) field angle of 30 degrees and a vertical and a vertical (i.e., y-coordinate) field angle of 19 degrees. In embodiments, the far MLA section of a dual MLA may provide an illumination intensity profile with a horizontal field angle of greater than 25 degrees and a vertical field angle of less than 25 degrees. Providing illumination with a narrow field enables the illumination of targets at farther distances for imaging and scanning of a target at the farther distance. Further, the rectangular shape of the illumination field reduces optical waste and increases energy efficiency since most targets for scanning include square or rectangular indicia such as a barcode.

Figure 7C:
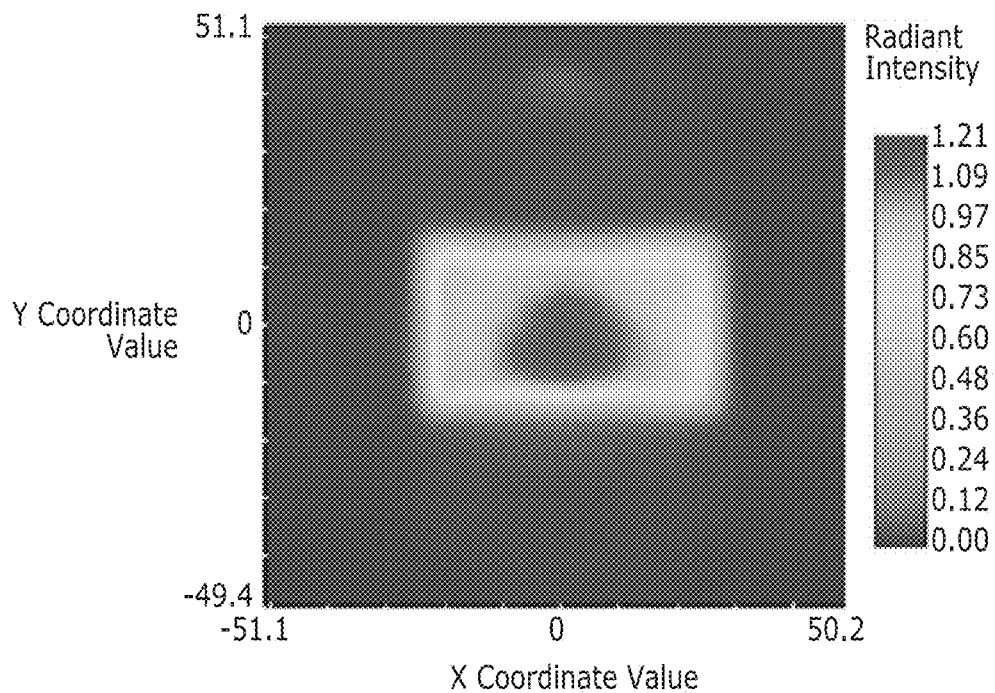
FIG. 7C is the illumination full field angle for a near MLA section of the dual MLA of FIG. 6.

FIG. 7C is a plot of the illumination full field angle for a near MLA section of a dual MLA, such as the dual MLA plate of FIG. 6. The intensity profile presented in FIG. 7C is rectangular with a horizontal field angle of 51 degrees and a vertical (i.e., y-coordinate) field angle of 28 degrees. In embodiments, the near MLA section of a dual MLA may provide an illumination intensity profile with a horizontal field angle of greater than 40 degrees and a vertical field angle of less than 30 degrees. Providing illumination with a wider field enables the illumination of targets at close distances for imaging and scanning of a target at the closer distance, as compared to the illumination field of FIG. 7B.

Figure 8A:
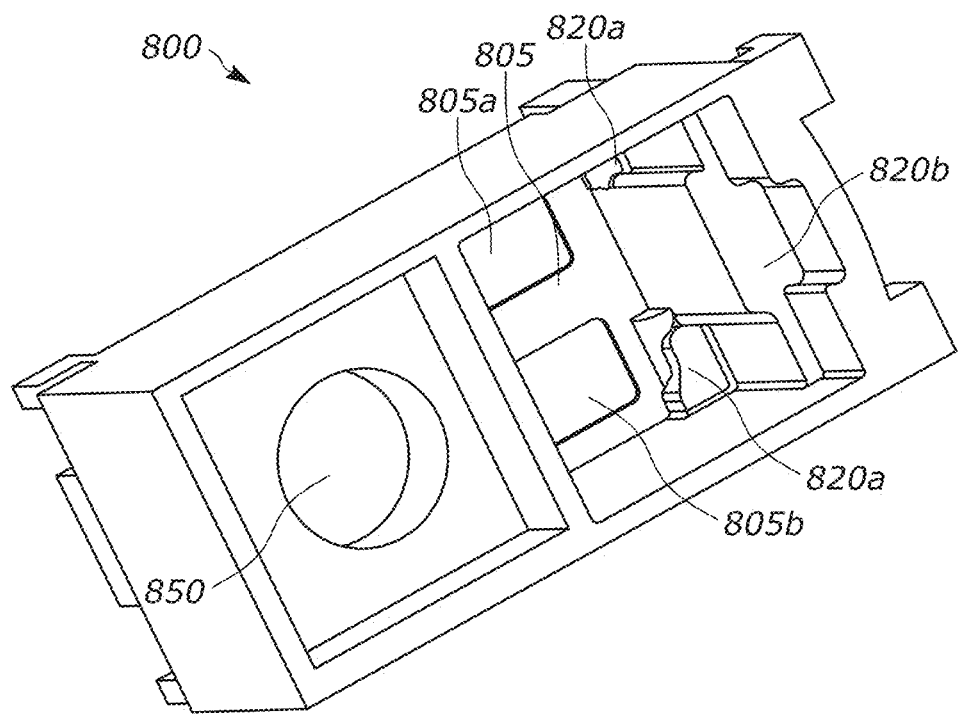
FIG. 8A is a perspective view of an illumination chassis having illumination apertures and support notches in accordance with the teachings of this disclosure.
Figure 8B:
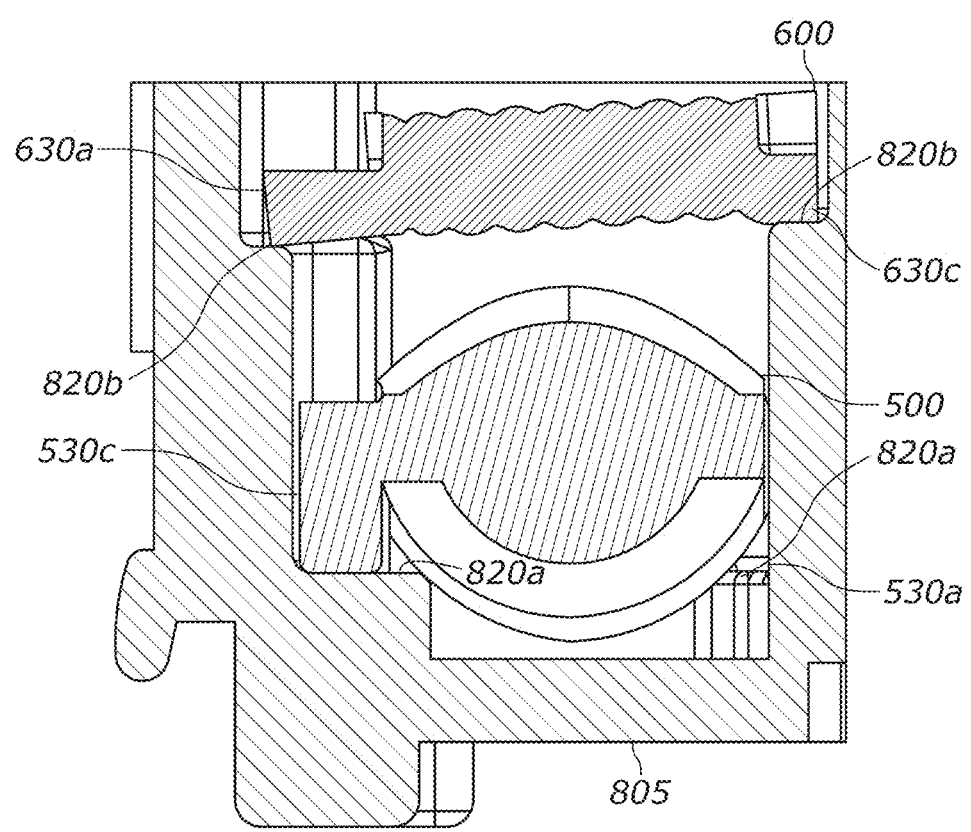
FIG. 8B is a cross-sectional side view of a portion of the illumination chassis of FIG. 8A containing the optics for the dual illumination system of FIG. 4A.

FIG. 8A is a perspective view of an illumination assembly chassis 800 having illumination apertures and support notches. FIG. 8B is a cross-sectional side view of a portion of the illumination assembly chassis of FIG. 8A housing optics for the dual illumination system 400 of FIG. 4A. Specifically, FIG. 8B illustrates the assembly chassis 800 housing the dual collimator 500 of FIG. 5A, and the dual MLA plate 600 of FIG. 6. Referring now simultaneously to FIGS. 8A, 8B, and 4, the chassis 800 has an aperture element 805 with a first and second aperture 805a and 805b. The first and second apertures 805a and 805b are positioned to transmit illumination provided by an illumination source such as the first or second illumination source 402a and 402b. The chassis 800 includes a detector region 850 for providing light to a sensor such as a camera for imaging of targets.

The assembly chassis 800 has a plurality of support structures 820a and 820b for supporting the dual MLA plate 600 and the dual collimator 500 and to maintain a fixed relative position between the dual collimator 500 and the dual MLA plate 600. In fabricating an illumination system that uses the chassis 800, the dual collimator 500 may be inserted into the chassis 800 and each of the tabs 530a, 530b, and 530c may physically contact a collimator support structure 820a. The collimator support structures 820a support the tabs 530a, 530b, and 530c to support and maintain the dual collimator 500 in a position that is aligned such that the dual collimator 500 collimates illumination provided to the dual collimator 500 through the apertures 805a and 805b. The tabs 530b and 530c of the dual collimator 500 are positioned apart from each other on the dual collimator 500 to provide a region between the dual collimator that may be filled with an upper level MLA support structure 820b for supporting the dual MLA plate 600. By interlacing the tabs 530b and 530c with the upper level MLA support structure 820b, the resulting illumination system is more compact than other optical mounting methods.

The dual MLA plate 600 may be inserted into the chassis 800 for supporting the MLA plate 600 in a position to receive illumination from the dual collimator 500. The tabs 630a, 630b, and 630c physically contact the upper level MLA support structures 630a, 630b, and 630c to support and maintain the position of the dual MLA plate 600. In embodiments, one or more tabs of the dual collimator 500 and/or the dual MLA plate 600 may be physically coupled to support structures of the chassis by an adhesive, a glue, a resin, or an epoxy. The offset interlaced tabs of the dual collimator and the dual MLA plate allow for efficient use of space in aligning the optical elements inside of the chassis 800 which minimizes materials, cost, and size of an illumination system.

The above description of the accompanying drawing of FIG. 3 is one example of the systems and methods described herein. Alternative implementations of the examples presented include one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples, the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. An optical assembly for illumination of a target, the optical assembly comprising:
    a first illumination source configured to provide first illumination along a first optical axis;
    a second illumination source configured to provide second illumination along a second optical axis, the second optical axis being not coaxial with the first optical axis;
    an aperture element having a first aperture disposed along the first optical axis and a second aperture disposed along the second optical axis, the first aperture configured to transmit the first illumination and the second aperture configured to transmit the second illumination;
    a collimator element having a first collimator disposed along the first optical axis and a second collimator lens disposed along the second optical axes, the collimator element configured to receive the first illumination and the second illumination from the aperture element and further configured to collimate the first illumination and the second illumination; and
    a microlens array element having a first microlens array disposed along the first optical axis and a second microlens array disposed along the second optical axes, the microlens array element having a first surface and a second surface, and the microlens array element being configured to receive, at the first surface, the first illumination and the second illumination from the collimator element and further configured to provide, from the second surface, a first output illumination field and a second output illumination field, wherein optical properties of the first microlens array are different from optical properties of the second microlens array.

2. The optical assembly of claim 1, wherein the first aperture and the second aperture are independent apertures of the aperture element.

3. The optical assembly of claim 1, wherein the first illumination source is disposed less than 5 millimeters away from the second illumination source.

4. The optical assembly of claim 1, wherein the collimator element further comprises a separator element disposed between the first collimator and the second collimator, the separator element configured to prevent the first illumination from entering the second collimator, and further configured to prevent the second illumination from entering the first collimator.

5. The optical assembly of claim 1, wherein the collimator element comprises a plastic material.

6. The optical assembly of claim 1, wherein the first collimator is configured to collimate the first illumination to have a square intensity profile with field angles less than 20 degrees in each direction.

7. The optical assembly of claim 1, wherein the second collimator is configured to collimate the second illumination to have a square intensity profile with field angles less than 20 degrees in each direction.

8. The optical assembly of claim 1, wherein the first output illumination field and the second output illumination field have different illumination intensity field angle profiles.

9. The optical assembly of claim 1, wherein the microlens array element comprises a plastic material.

10. The optical assembly of claim 1, wherein the first illumination source comprises a light emitting diode.

11. The optical assembly of claim 1, wherein the second illumination source comprises a light emitting diode.

12. The optical assembly of claim 1, wherein the distance between the first illumination source and the second surface of the microlens array element is less than 7 millimeters.

13. The optical assembly of claim 1, wherein a distance from the second surface of the microlens array element to the target is between 2 and 200 inches.

14. The optical assembly of claim 1, wherein the first output illumination field has a rectangular intensity profile.

15. The optical assembly of claim 14, wherein the rectangular intensity profile of the first output illumination field has a first field angle of less than 25 degrees and a second field angle of greater than 25 degrees.

16. The optical assembly of claim 1, wherein the second output illumination field has a rectangular intensity profile.

17. The optical assembly of claim 16, wherein the rectangular intensity profile of the second output illumination field has a first field angle of less than 30 degrees and a second field angle of greater than 40 degrees.

18. The optical assembly of claim 1, further comprising an assembly chassis that houses the collimator element and the microlens array element, the assembly chassis configured to support the collimator element and the microlens array element and to maintain a fixed relative position of the collimator element and the microlens array element.

19. The optical assembly of claim 18, wherein the assembly chassis comprises:

a first collimator support configured to physically contact the collimator element to support the collimator element and to maintain a position of the collimator element;

a second collimator support configured to physically contact the collimator element to support the collimator element and to maintain a position of the collimator element;

a first microlens array support configured to physically contact the microlens array element to support the microlens array element and to maintain a position of the microlens array element; and a second microlens array support configured to physically contact the microlens array element to support the microlens array element and to maintain a position of the microlens array element.

20. The optical assembly of claim 19, wherein the first microlens array support and the second microlens array support are interlaced with the first collimator support and the second collimator support.

21. The optical assembly of claim 1, wherein the first microlens array includes a plurality of cylindrical lenses and wherein the second microlens array includes a plurality of rectangular lenses.

* * * * *